Feb. 23, 1926.
M. L. GALLESIO-PIUMA
1,574,256
METHOD FOR THE FILLING OF HONEYCOMBS WITH SWEET
LIQUID FOR THE NOURISHMENT OF BEES
Filed Dec. 26, 1922
2 Sheets-Sheet 1
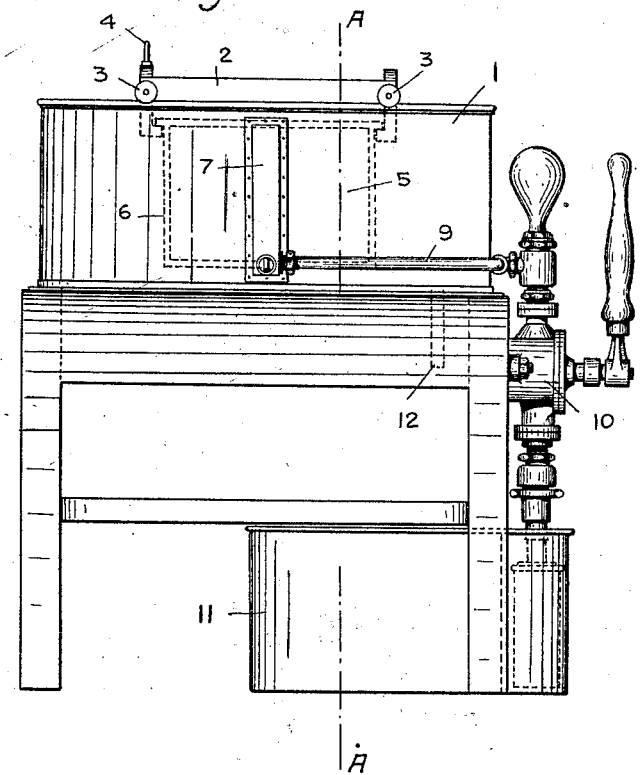
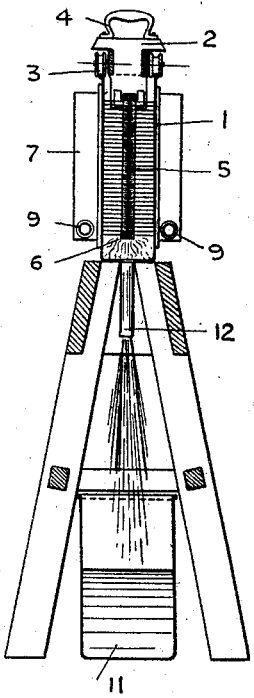
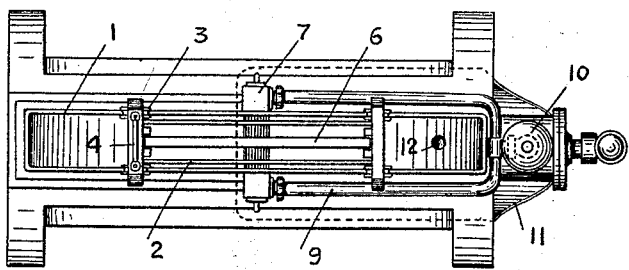
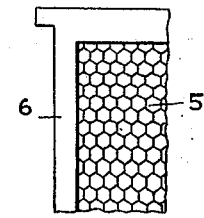
Inventor:
M. L. Gallesio-Piuma

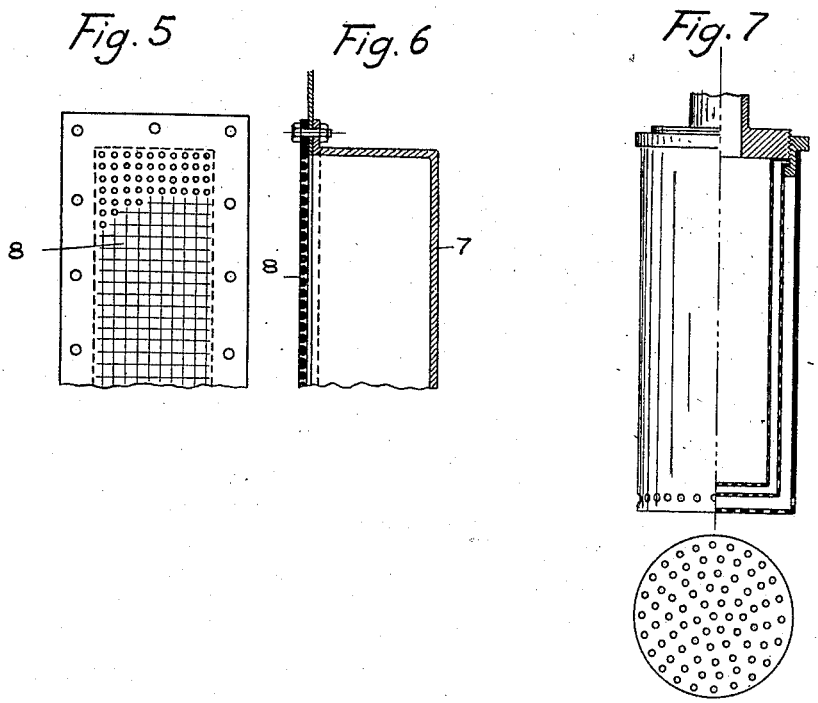

Patented Feb. 23, 1926.

1,574,256

UNITED STATES PATENT OFFICE.

MICHELE LORENZO GALLESIO-PIUMA, OF PIEMONTE, ITALY.

METHOD FOR THE FILLING OF HONEYCOMBS WITH SWEET LIQUID FOR THE NOURISHMENT OF BEES.

Application filed December 26, 1922. Serial No. 609,153.

*To all whom it may concern:*

Be it known that I, MICHELE LORENZO GALLESIO-PIUMA, a subject of the King of Italy, residing at Piemonte, Italy, have invented a new and useful Method for the Filling of Honeycombs with Sweet Liquid for the Nourishment of Bees, of which the following is a specification.

This invention relates to a method for filling honey combs with sweet liquid for the nourishment of bees. The method consists in exposing the hollow combs to the action of sprinklers which project thin jets of liquid parallel to one another in the cells of the combs in such manner that each jet hits the bottom of a cell so that all cells included in the area of the sprinkler are simultaneously filled.

A form of apparatus for carrying out the method is illustrated in the accompanying drawing according to which the honey comb to be filled is arranged between two sprinklers, the sweet liquid being sprayed through these sprinklers under pressure by mechanical means and hence projected through the holes of the sprinklers upon the two opposite faces of the comb, thus filling its cells.

The apparatus for carrying out the method is illustrated in the accompanying drawings in which:

Figure 1 is a side view of the apparatus.

Figure 2 is a vertical transverse section of the same taken on the line A—A of Figure 1.

Figure 3 is a top plan view of the apparatus.

Figure 4 is a side view partly in section of a portion of one of the combs to be filled.

Figure 5 is a side view of a portion of one of the sprinkler heads applied with the apparatus.

Figure 6 is a transverse vertical sectional view of said head.

Figure 7 is a side view partly in section and a bottom plan view of the inlet filter of the pump used with the apparatus.

In the drawings, 1 is a metallic box of rectangular shape upon the upper longitudinal edges of which is arranged a carriage 2 having supporting rollers 3 which travel on the said edges when the operator grasps the handle 4 and moves the carriage. The carriage supports the comb 5 enclosed within the wooden frame 6.

The rectangular receptacle has at each side a sprinkler chamber 7 and these chambers communicate by means of the perforated walls 8 with the interior of the rectangular receptacle 1. The perforated walls 8 correspond in their height with the height of the honey combs; they can however, be variable in width and in this case the filling of the honey comb will be effected by the displacement of the same within the receptacle 1. The displacement of the comb will therefore be required only when the sprinklers have a width inferior to that of the comb. The chambers 7 of the sprinklers communicate by means of the tubes 9 with a suction and pressure pump 10 which immerses in the receptacle 11 of the sweet liquid.

By operating the pump 10 the liquid is forced into the sprinkler chambers and projects with force in very thin jets which enter in the cells of the honey comb in filling them. 12 is a tube which discharges in the receptacle 11 the excess of sweet liquid admitted to the sprinklers.

The displacement of the slide 2 could also be effected with mechanical means.

A filter which cooperates with the tank 11 is shown in Figure 7.

The honey combs can be filled with honey, syrup or with curative or antiseptic substances in case of epidemic disease amongst the bees.

Having now particularly described and ascertained the nature of my said invention and the manner in which the same is to be performed, I declare that what I claim is:—

1. A method for filling honey combs with sweet liquid for the nourishment of bees consisting in exposing a hollow comb between two oppositely disposed sprinklers, and forcing a sweet liquid through said sprinklers under pressure upon the two opposite faces of the comb for filling the cells of the latter.

2. A method for filling honey combs with sweet liquid for the nourishment of bees consisting in exposing a hollow comb between two sprinklers, forcing a sweet liquid under pressure through said sprinklers upon the two opposite faces of the comb for filling the cells of the latter, collecting the sweet liquid draining from said cells, and returning the collected liquid under pressure through the sprinkler upon the opposite faces of the comb.

3. A method for filling honey combs with sweet liquid for the nourishment of bees, consisting in exposing a hollow comb between two sprinklers, forcing a sweet liquid under pressure through said sprinklers upon the opposite faces of the comb for filling the cells of the latter, and moving the comb endwise during such treatment to expose all portions of the comb to the liquid.

In testimony whereof I have signed my name to this specification.

MICHELE LORENZO GALLESIO-PIUMA.